(12) United States Patent
Li et al.

(10) Patent No.: US 8,706,107 B2
(45) Date of Patent: Apr. 22, 2014

(54) METHOD, APPARATUS AND SYSTEM FOR REGISTERING IN UNIVERSAL SERVICE INTERFACE SYSTEM

(75) Inventors: Hong Li, Shenzhen (CN); Lei Lu, Shenzhen (CN); Chenghui Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 12/793,233

(22) Filed: Jun. 3, 2010

(65) Prior Publication Data

US 2010/0238867 A1    Sep. 23, 2010

Related U.S. Application Data

(63) Continuation of application No. PCT/CN2009/071358, filed on Apr. 20, 2009.

(30) Foreign Application Priority Data

Apr. 25, 2008 (CN) .......................... 2008 1 0066887

(51) Int. Cl.
*H04W 36/14* (2009.01)
(52) U.S. Cl.
USPC .................. 455/432.1; 370/310; 455/436
(58) Field of Classification Search
USPC ............... 370/310; 455/403, 422.1, 424, 425, 455/432.1, 433, 435.1
See application file for complete search history.

(56) References Cited

U.S. PATENT DOCUMENTS

| | | | | |
|---|---|---|---|---|
| 7,149,229 B1* | 12/2006 | Leung | | 370/466 |
| 2003/0147537 A1* | 8/2003 | Jing et al. | | 380/277 |
| 2004/0032844 A1* | 2/2004 | Lewis et al. | | 370/338 |
| 2005/0136920 A1* | 6/2005 | Rink et al. | | 455/433 |
| 2006/0135157 A1* | 6/2006 | Baek et al. | | 455/433 |
| 2006/0248206 A1 | 11/2006 | Moerdijk et al. | | |
| 2008/0081593 A1* | 4/2008 | Moon et al. | | 455/408 |
| 2008/0107092 A1* | 5/2008 | Taaghol et al. | | 370/338 |
| 2008/0279136 A1* | 11/2008 | Taaghol et al. | | 370/328 |

FOREIGN PATENT DOCUMENTS

| | | |
|---|---|---|
| CN | 1422083 | 6/2003 |
| CN | 1643853 | 7/2005 |
| CN | 1643853 A | 7/2005 |

(Continued)

OTHER PUBLICATIONS

Aboba et al. RFC 4282 "The Network Access Identifier," Dec. 2005, all pages.*

(Continued)

*Primary Examiner* — Edan Orgad
*Assistant Examiner* — Curtis A Alia
(74) *Attorney, Agent, or Firm* — Brinks Gilson & Lione

(57) ABSTRACT

A method, an apparatus, and a system for registering in a USI system are disclosed herein. The method includes: an H-USI system receives a USI registration request message that carries an identifier of a terminal from a V-USI system; and the H-USI system interacts with an H-AAA server according to the USI registration request message to perform USI system registration for the terminal. An apparatus for registering in a USI system is disclosed herein. The apparatus includes a receiving module and a registering module. Through the method and the system disclosed herein, the terminal can be registered in the USI system successfully, and the USI service can be implemented smoothly.

7 Claims, 9 Drawing Sheets

(56) References Cited

FOREIGN PATENT DOCUMENTS

| CN | 101345997 A | 1/2009 |
|---|---|---|
| EP | 1317159 A1 | 6/2003 |
| WO | WO 03/081859 A1 | 10/2003 |

OTHER PUBLICATIONS

International Search Report from P.R. China in International Application No. PCT/CN2009/071358 mailed Jul. 30, 2009.

First Chinese Office Action issued by the State Intellectual Property Office of the PRC for application No. 200810066887.9, mailed Apr. 13, 2010, 4 pgs., Partial English translation attached.

Taaghol, P., WiMAX Forum, "USI Roaming", Taipei, Oct. 2007, 10 pgs.

WiMAX Forum; Universal Services Interface (USI); An Architecture for Internet+ Service Model; NWG Release 1.5, DRAFT, Jun. 2007, 53 pgs.

WiMAX Forum Network Architecture (Stage 3: Detailed Protocols and Procedures); Release 1.1.2, Nov. 8, 2007, 547 pgs.

WiMAX Forum™ Network Architecture; Universal Services Interface (USI); An Architecture for Internet+ Service Model; DRAFT-T33-115-R015v01-B; Working Group Approved Specification, May 20, 2009, 123 pgs.

Written Opinion of the International Searching Authority (translation) dated (mailed) Jul. 30, 2009, issued in related Application No. PCT/CN2009/071358, filed Apr. 20, 2008, Huawei Technologies Co., Ltd.

Second Chinese Office Action dated (mailed) Nov. 2, 2011, issued in related Chinese Application No. 200810066887.9 Huawei Technologies Co., Ltd.

\* cited by examiner

METHOD, APPARATUS AND SYSTEM FOR REGISTERING IN UNIVERSAL SERVICE INTERFACE SYSTEM

CROSS-REFERENCE TO RELATED APPLICATIONS

This application is a continuation of International Application No. PCT/CN2009/071358, filed on Apr. 20, 2009, which claims priority to Chinese Patent Application No. 200810066887.9, filed on Apr. 25, 2008, both of which are hereby incorporated by reference in their entireties.

FIELD OF THE INVENTION

The present invention relates to communication technologies, and in particular, to a method, an apparatus, and a system for registering in a Universal Service Interface (USI) system.

BACKGROUND OF THE INVENTION

Worldwide Interoperability for Microwave Access (WiMAX) is a wireless Metropolitan Area Network (MAN) technology based on IEEE802.16. The radio side of the WiMAX network is a wireless MAN access technology based on IEEE802.16d/e, and is based on the physical layer technology of Orthogonal Frequency Division Multiplexing (OFDM) technology and OFDM Access (OFDMA), and can resist multi-path fading effectively. In the case of best channel fading, the transmission rate approaches 75 Mbps.

The logical architecture of the WiMAX network is shown in FIG. 1. The whole WiMAX network includes the following three parts:

(1) Terminal. A terminal includes a Subscriber Station (SS) or Mobile Station (MS), through which the terminal accesses the WiMAX network.

(2) Access Service Network (ASN). An ASN is defined as a network function set that provides radio access services for a WiMAX terminal. An ASN includes two elements: a Base Station (BS) and an ASN Gateway (ASN-GW). The BS provides L2 connection and radio resource management for the BS and the MS, and the ASN-GW provides client functions in authentication, authorization and accounting of the MS, and provides the L3 information relay functions (such as IP address allocation) and intra-ASN handover for the MS.

(3) Connectivity Service Network (CSN). A CSN is defined as a network function set that provides IP connection access services for a WiMAX terminal. A CSN includes logical entities such as PrePayment Service (PPS) server and Authentication, Authorization and Accounting (AAA) server, and provides these functions: IP address allocation for MS, Internet access, AAA proxy or server, and terminal-based authorization control.

With the requirement of opening network services, the WiMAX network introduces a third-party application interface that can open WiMAX network services to a third-party application interface inside or outside the network, namely, a Universal Service Interface (USI). Through a USI system, the WiMAX network can provide service interfaces for an Application Service Provider (ASP) or internet Application Service Provider (iASP). By invoking service capabilities provided by the USI, the ASP or iASP can apply the services open to WiMAX access terminals, and can provide individualized services for WiMAX access terminals more conveniently through an ASP network or Internet. The service capabilities opened by the WiMAX network through a USI system include: Quality of Service (QoS), location service, multicast and broadcast services, terminal information query, and terminal authentication.

FIG. 2 is a network reference model of a USI system. In the USI system, the MS, ASN and the CSN are three major parts of the WiMAX network, and the ASP/iASP is an application service provider independent of the WiMAX network. As shown in FIG. 2, the USI system is located in a CSN, and interacts with the ASP/iASP through a U1 interface. Optionally, a USI system interacts with an AAA server, a message server, and a location server within the CSN. The MS uses the existing Internet interface (such as HTTP) to interact with the ASP/iASP.

Within a WiMAX network, the terminal has a unique internal identity, and the internal identity is stored in an AAA server of the CSN. Based on this internal identity, the WiMAX network provides its capabilities and services. For safety and privacy, the internal identity is not disclosed to any entity outside the WiMAX network. In order to provide a specific terminal with services based on WiMAX USI system capabilities, the ASP/iASP needs to identify the identity of the terminal inside the WiMAX network through the USI identity of the terminal so that the WiMAX network can provide services based on the internal identity.

The existing protocol does not define how to register a terminal in a USI system after the terminal roams to a remote area; the prior art does not enable registration in a USI system when the terminal is in a roaming state, which further affects the service implementation; moreover, after the terminal roams to a remote area, USI registration cannot be triggered as required. If the terminal is registered in a USI system of the home network, the USI system in the visited network is unable to obtain the USI registration information of the terminal in the home network, which affects implementation of certain services such as broadcast service which is available only from the visited network rather than the home network.

SUMMARY OF THE INVENTION

The embodiments of the present invention provide a method, an apparatus, and a system for registering a terminal in a USI system so that the terminal in a roaming state can be registered in a USI system.

The technical solution under the present invention is as follows:

A method for registering in a USI system includes:
receiving, by a Home network USI (H-USI) system, a USI registration request message that carries an identifier of a terminal from a Visited network USI (V-USI) system; and interacting with a Home network AAA (H-AAA) server according to the USI registration request message to perform USI system registration for the terminal.

An apparatus for registering in a USI system includes:
a receiving module, adapted to receive a USI registration request message that carries an identifier of a terminal; and
a registering module, adapted to perform USI system registration for the terminal according to the USI registration request message.

A system for registering in a USI system includes a V-USI system and an H-USI system.

The V-USI system is adapted to send a USI registration request message that carries an identifier of a terminal to the H-USI system; and The H-USI system is adapted to interact with an H-AAA server according to the USI registration request message to perform USI system registration for the terminal.

A communication system includes a Visited network Connectivity Service Network (V-CSN), a Home network Connectivity Service Network (H-CSN), and a Home Agent (HA). The V-CSN is interfaced with the H-CSN through an R5 interface.

The V-CSN includes a V-USI system, and the H-CSN includes an H-USI system. An interface exists between the H-USI system and the V-USI system. The interface is an independent interface, or is a part of the logical interface of the R5 interface.

The interface is adapted to transmit service-related information between the H-USI system and the V-USI system.

The HA is adapted to transmit the service data between the ASP and the terminal.

In the embodiments of the present invention, the home network USI system sends a registration request message to the visited network USI system so that the home network USI system can register a roaming terminal, and the subsequent USI service can be implemented normally.

Another method for registering in a USI system includes: receiving, by an H-USI system, a USI registration request message that carries an identifier of a terminal from the terminal, an ASP, or an H-AAA server; and
interacting with the H-AAA server according to the USI registration request message to perform USI system registration for the terminal.

In the foregoing method for registering in a USI system, a terminal or ASP triggers USI registration proactively. Therefore, after the terminal roams to a remote area, the USI registration can be performed as required, and the USI service can be implemented.

BRIEF DESCRIPTION OF THE DRAWINGS

To make the technical solution in the present invention or in the prior art clearer, the following outlines the accompanying drawings for illustrating the embodiments of the present invention or the prior art. Apparently, the accompanying drawings outlined below are for the exemplary purpose only, and persons of ordinary skill in the art can derive other drawings from such accompanying drawings without creative effort.

DETAILED DESCRIPTION OF THE EMBODIMENTS

The following detailed description is directed to the technical solution of the present invention with reference to the accompanying drawings. However, the embodiments to be described are only a part of, rather than all of, the embodiments of the present invention. Additionally, all other embodiments, which can be derived by those skilled in the art from the embodiments given herein without any creative efforts, fall within the scope of the present invention.

The embodiments of the present invention provide a method and a system for registering a terminal in a USI system so that the terminal in a roaming state can be registered in a USI system.

In an embodiment of the present invention, an H-USI system receives a USI registration request message that carries an identifier of a terminal from a V-USI system; and The H-USI system interacts with an H-AAA server according to the USI registration request message to perform USI system registration for the terminal.

In another embodiment of the present invention, the USI registration request message may be sent by an ASP, MS, or H-AAA server, and the registration method includes the following:

An H-USI system receives a USI registration request message that carries an identifier of a terminal from the terminal, an ASP, or an H-AAA server; and the H-USI system interacts with the H-AAA server according to the USI registration request message to perform USI system registration for the terminal.

Figure 1:
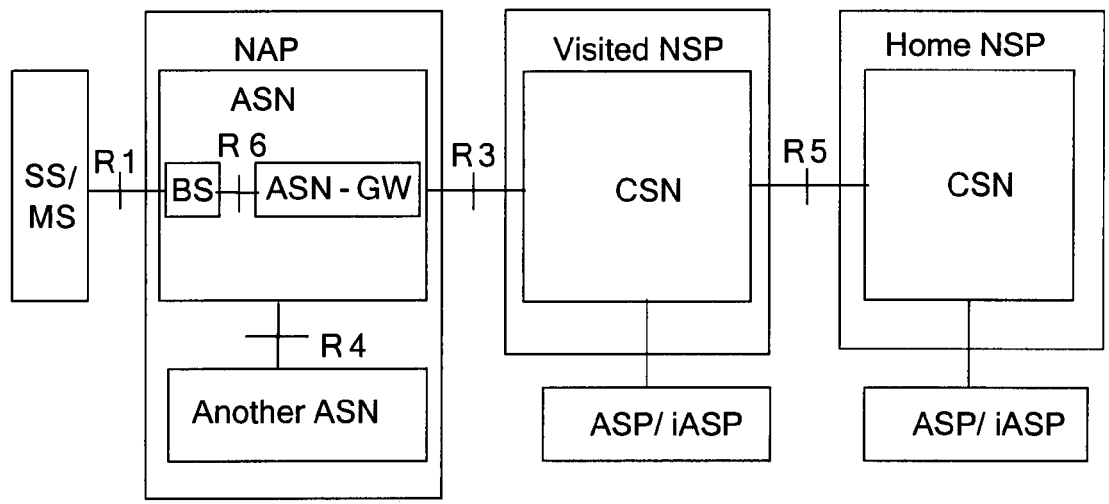
FIG. 1 shows a WiMAX network structure in the prior art.
Figure 2:
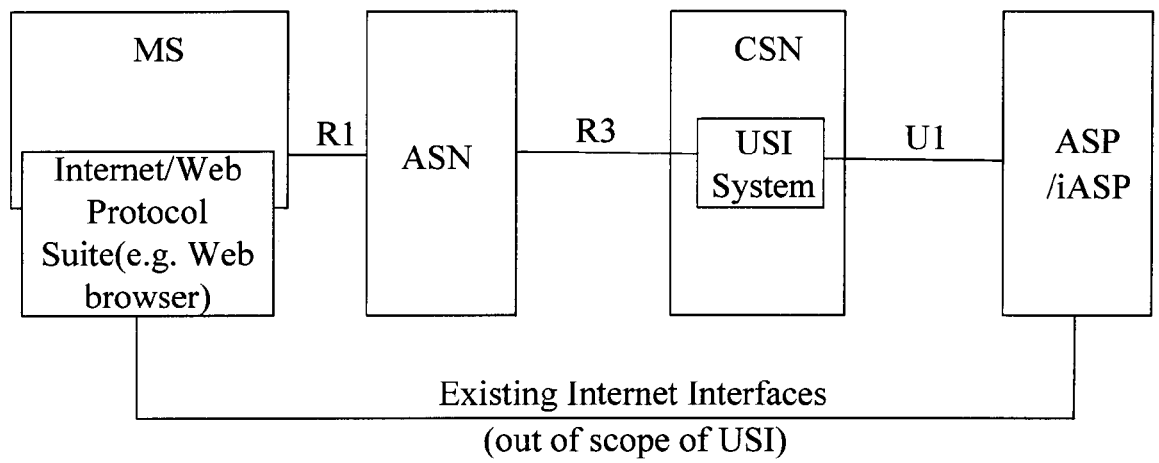
FIG. 2 shows a WiMAX network structure inclusive of a USI system in the prior art.
Figure 3:
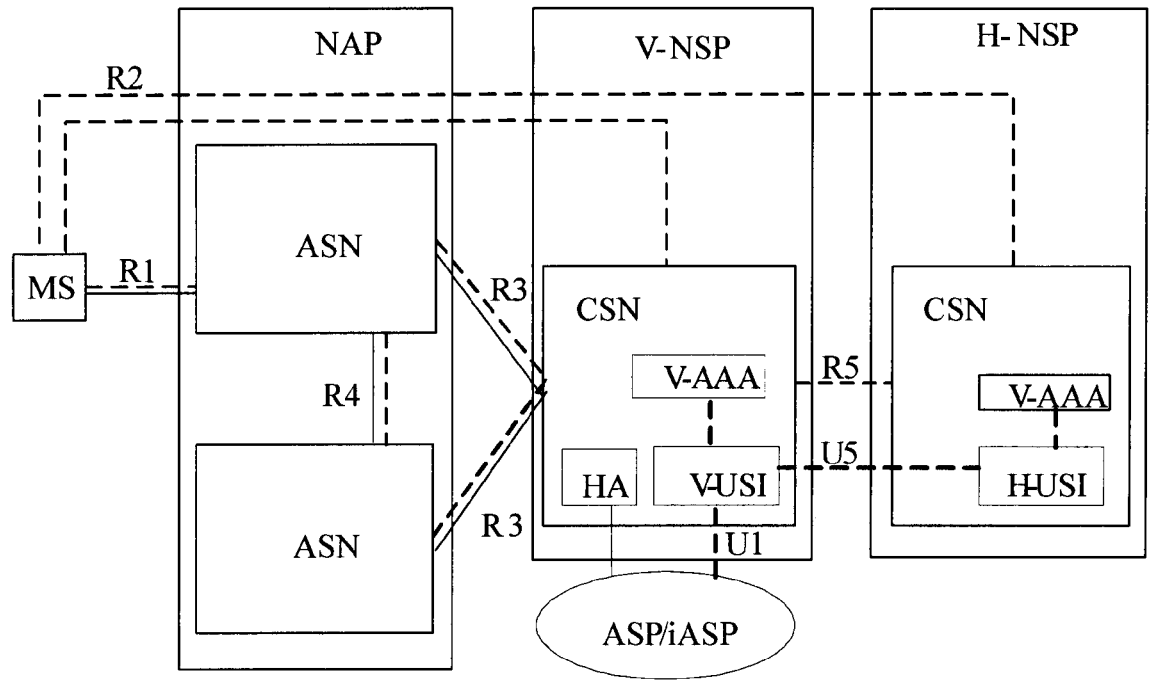
FIG. 3 shows an application scenario of a USI system registration method in an embodiment of the present invention.
Figure 4:
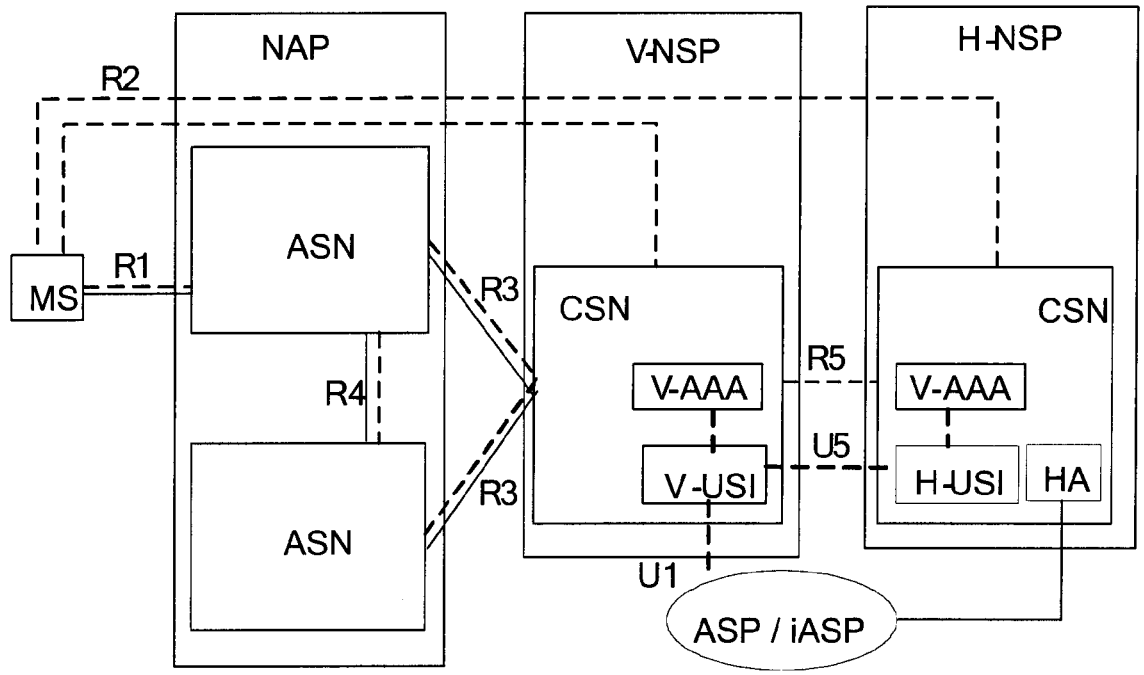
FIG. 4 shows an application scenario of a USI system registration method in an embodiment of the present invention.

FIG. 3 shows an application scenario of a USI system registration method in an embodiment of the present invention. In this scenario, the HA is located in a CSN of a visited Network Service Provider (V-NSP), or located in a CSN of a home Network Service Provider (H-NSP). If the HA is located in a home network (H-NSP), the network structure is shown in FIG. 4. The roaming protocol between the H-NSP and the V-NSP decides whether the HA is located in the home network or visited network. The HA is adapted to transmit service data between the ASP and the MS. When the terminal accesses the network, the network allocates an IF address to the terminal, and the IF address corresponds to the address of the HA. The ASP can determine the address of the H-USI or V-USI according to the IP address of the user or the address of the HA.

Both the home network and the visited network have a USI system. No direct interface or Service Level Agreement (SLA) exists between the ASP/iASP and the H-USI system, and no USI service can be provided for a roaming terminal through the H-USI system directly. A direct U1 interface exists between the ASP/iASP and the V-USI system.

Figure 5:
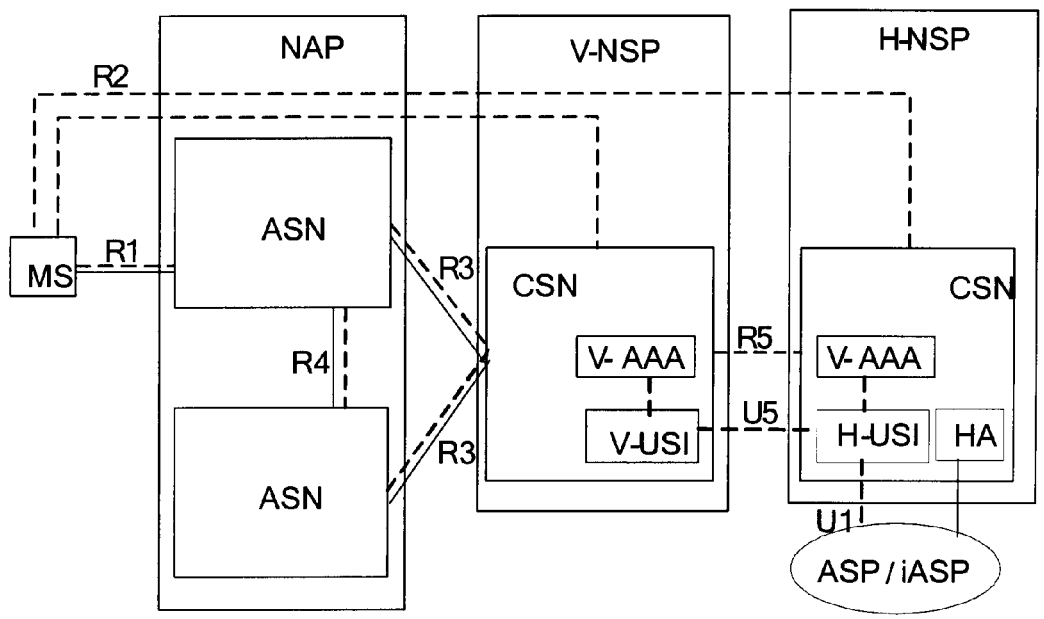
FIG. 5 shows an application scenario of a USI system registration method in an embodiment of the present invention.
Figure 6:
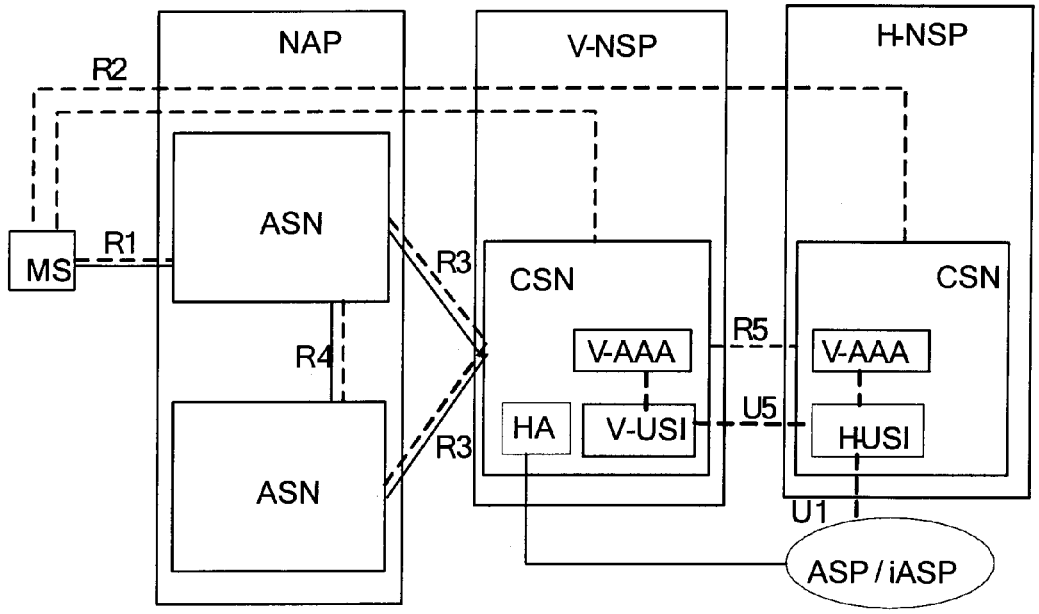
FIG. 6 shows an application scenario of a USI system registration method in an embodiment of the present invention.

FIG. 5 shows another application scenario of a USI system registration method in an embodiment of the present invention. Both the home network and the visited network have a USI system. A direct U1 interface exists between the ASP/iASP and the H-USI system; a direct U1 interface may exist between the ASP/iASP and the V-USI system or not. The HA is located in the CSN of the home network or in the CSN of the visited network. If the HA is located in the visited network, the network structure is shown in FIG. 6. The roaming protocol between the H-NSP and the V-NSP decides whether the HA is located in the home network or visited network. In the following embodiments, the ASP and the iASP are collectively called "ASP".

In the foregoing application scenarios, the newly added interface is U5, which is a direct interface between different USI systems, or a part of the logical interface of the R5 interface between the H-CSN and the V-CSN.

The U5 interface is primarily adapted to transmit USI service information between the USI system of one network and USI system of another network, for example, transmit USI registration request messages between USI systems;

transmit USI service invocation messages between USI systems;

transmit USI ID authentication messages between USI systems;

transmit USI service charging messages between USI systems; and transmit USI service supportability negotiation messages between USI systems.

In the application scenarios shown in FIG. 3, FIG. 4, FIG. 5, and FIG. 6 above, the U5 interface exists between the H-USI system and the V-USI system.

In the application scenarios shown in FIG. 3 and FIG. 4, in the case of transmitting USI service information to the H-USI system of the terminal through the V-USI system, the V-USI system is equivalent to a USI proxy. In the foregoing scenario, the USI proxy may also exist in a third-party network only if the foregoing U5 interface exists between the USI system of the third-party network and the H-USI system.

Figure 7:
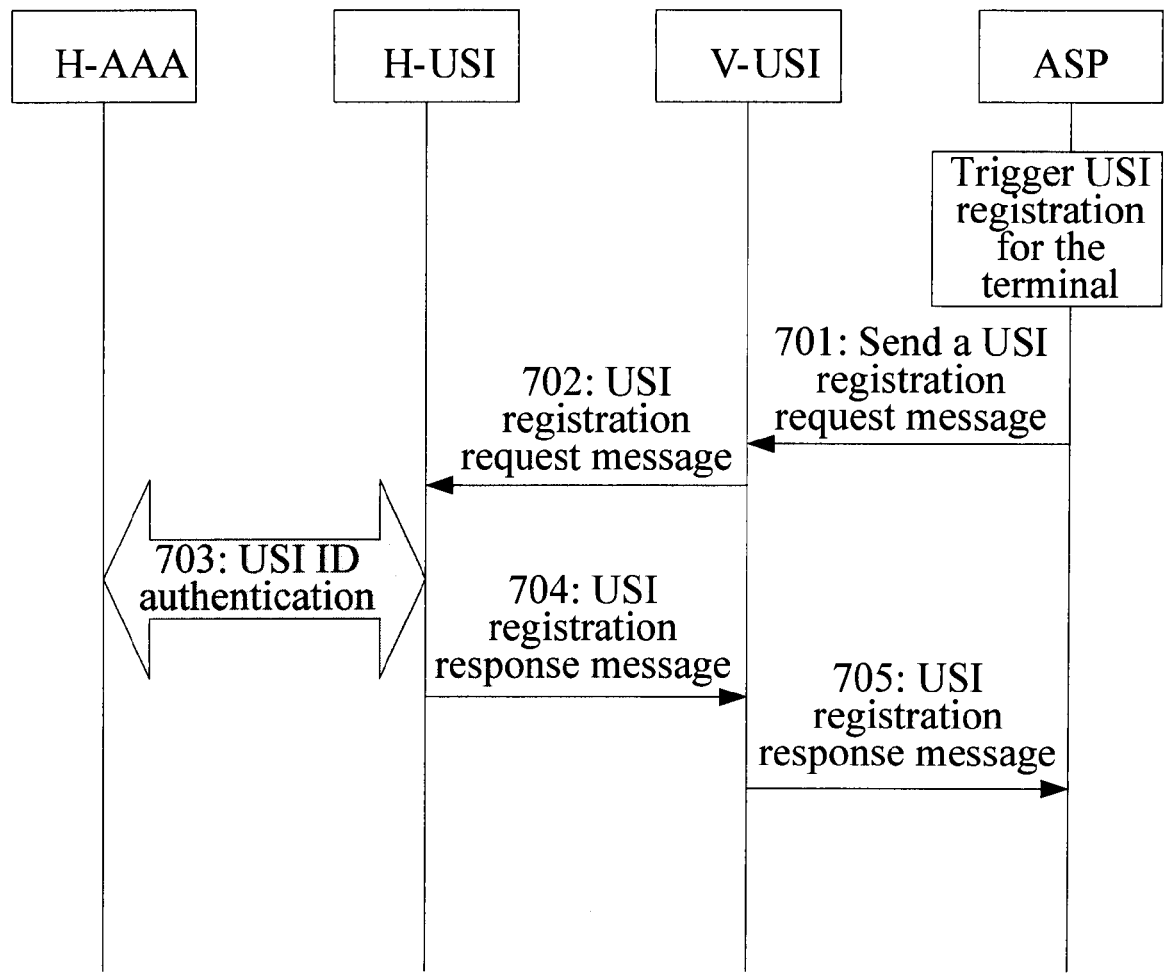
FIG. 7 is a flowchart of a USI system registration method in an embodiment of the present invention.

Corresponding to the application scenarios in FIG. 3 or FIG. 4, if the USI registration of the terminal is triggered by the ASP, the USI system registration method in this embodiment includes the following steps, as shown in FIG. 7:

701: The ASP triggers the registration of the terminal onto the USI system, and sends a USI registration request message to the V-USI system.

After the terminal roams to a remote area, the ASP may trigger registration of the terminal onto the USI system, and send a registration request message to the V-USI system proactively. The registration request message includes the ID of the terminal. The ID is an identifier the terminal in the network, and may be the IP address of the terminal, a permanent USI ID, or a short-lived USI ID or Network Access Identifier (NAI).

In another embodiment, the ASP may send the request to the USI system of a third-party network if a direct or indirect U5 interface exists between the USI of the third-party network and the H-USI system.

The ASP may determine the location of a V-USI system or a third-party network USI system routed to the H-USI according to the following (a), (b), or (c):

(a) IP address of the terminal. If the HA is distributed in the visited network, as shown in FIG. 3, the IP address of the terminal is the IP address in the visited area, and therefore, the ASP can determine the network visited by the terminal according to the IP address of the terminal, and further determine the location of the V-USI.

(b) USI route information configured by the ASP. On an ASP, the information about the route between the USI system in a subscription relation with the ASP and the related USIs can be configured. The ASP determines the location of the V-USI system or USI proxy according to the configured USI route information. If the location of the USI system in the roaming area of the terminal is uncertain, another U5 interface routed to the H-USI system of the terminal may be selected.

(c) Route query is introduced into a stand-alone USI system in the network. The USI system stores USI system information in the network, and the subscription or route relations between USI systems. In this USI system, the ASP can find the location of the V-USI system or a third-party network USI system routed to the H-USI system.

702: The V-USI forwards the registration request message to the H-USI of the terminal. The message is transmitted through the U5 interface between the H-USI and the V-USI.

703: After receiving the registration request message, the H-USI system interacts with the H-AAA server to perform USI system registration for the terminal.

For example, the H-USI determines the network identifier of the terminal according to the terminal identifier in the registration request message, and sends a request for USI service information context of the terminal to the H-AAA server. The USI authentication and service authorization are performed for the terminal between the H-AAA server and the H-USI system in light of the terminal subscription information.

After completion of registration, the H-USI can allocate a short-lived USI ID as a USI service identifier to the terminal.

The short-lived USI ID allocated by the H-USI system to the terminal reflects the location of the V-USI system of the terminal. For example, V-USI realm name information can be added into the USI ID. Upon completion of registration, the ASP can determine the location of the V-USI system according to the V-USI realm name information in the short-lived USI ID.

704: The H-USI system sends a USI registration response message to the V-USI system.

The registration response message carries part or all of the USI registration information of the terminal. If the H-USI system allocates a short-lived ID to the terminal in step 703, the message may further carry the short-lived USI ID allocated by the H-USI system. The V-USI system may store part or all registration information of the terminal and the short-lived USI ID so that the ASP can invoke the V-USI system conveniently to implement part of the USI service.

705: The V-USI system forwards the USI registration response message to the ASP.

If the H-USI system allocates a short-lived ID to the terminal in step 703, the message further carries the short-lived USI ID allocated by the H-USI system. The ASP may determine the location of the V-USI system according to the V-USI realm name information in the short-lived USI ID.

Step 704 and step 705 are optional.

In the foregoing embodiment, the ASP triggers the USI registration for the terminal, and the USI registration request message is forwarded by the V-USI system to the H-USI system through the newly added U5 interface. In this way, the roaming terminal is registered on the USI system, and the subsequent USI services can be implemented smoothly. Moreover, because the V-USI realm name information is added into the short-lived USI ID allocated to the terminal, after completion of registration, the ASP may determine the location of the V-USI system according to the V-USI realm name information in the USI ID. Therefore, the ASP can invoke the V-USI system to provide some visited area services such as broadcast service, QoS query, and terminal positioning.

Figure 8:
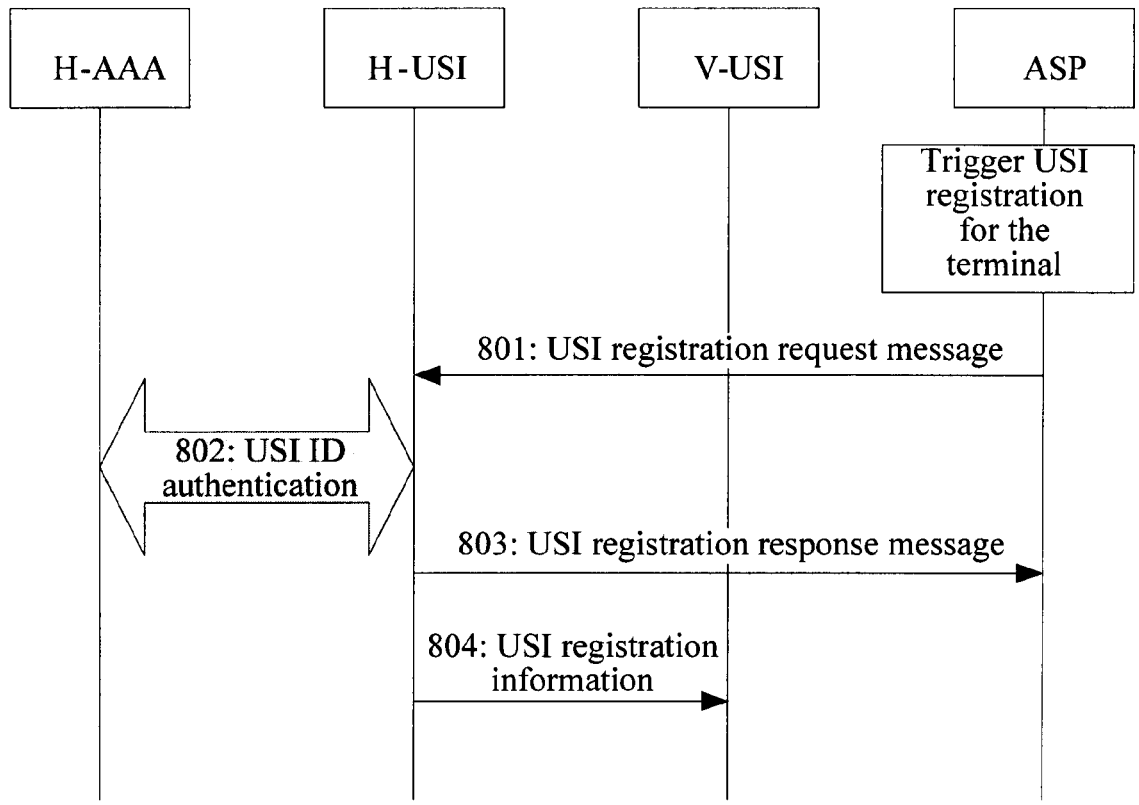
FIG. 8 is a flowchart of a USI system registration method in an embodiment of the present invention.

Corresponding to the application scenarios in FIG. 5 and FIG. 6, if the USI registration of the terminal is triggered by the ASP, the USI system registration method in this embodiment includes the following steps, as shown in FIG. 8:

801: The ASP triggers registration and sends a registration request message to the H-USI system.

The ASP sends a registration request message to the H-USI system directly through a U1 interface. The registration request message carries the ID of the terminal. The ID is an identifier the terminal in the network, and may be the IP address of the terminal, a permanent USI ID, or a short-lived USI ID or NAI.

802: The H-USI system interacts with the H-AAA server to perform USI system registration for the terminal.

This step is similar to step 703.

In the foregoing scenario, the registration process after the terminal roams to a remote area is similar to the USI registration process initiated by the ASP in a non-roaming state; the H-USI stores the terminal information after completion of USI registration for the terminal. The H-USI may allocate a short-lived USI ID to the terminal for identifying the USI system of the terminal at the time of invoking the service of the USI system.

The short-lived USI ID allocated by the H-USI system to the terminal reflects the location of the V-USI system of the terminal. For example, V-USI realm name information can be added into the USI ID. Upon completion of registration, the ASP can determine the location of the V-USI system according to the V-USI realm name information in the short-lived USI ID.

803: The H-USI system sends a USI registration response message to the ASP.

If the H-USI system allocates a short-lived USI ID to the terminal in step 803, the registration response message further carries the short-lived USI ID. The ASP may determine the location of the V-USI system according to the V-USI realm name information in the short-lived USI ID.

804: Upon completion of the USI registration, the H-USI system may send part or all of the USI registration information of the terminal to the V-USI system.

If the H-USI system allocates a short-lived ID to the terminal in step 803, this message further carries the short-lived ID allocated by the H-USI.

If the V-USI system stores part or all of the USI registration information of the terminal, after completion of registration, the ASP may invoke the V-USI system to provide some visited area services such as broadcast service, QoS query, and terminal positioning.

In the foregoing embodiment, if the visited network has no USI system, no U5 interface exists between the H-USI system and the V-USI system. In this case, the foregoing solution is also applicable, with step 804 being omitted.

In the foregoing embodiment, the ASP triggers the USI registration for the terminal directly, and the subsequent USI registration is implemented as required by the terminal. Moreover, because the V-USI realm name information is added into the short-lived USI ID allocated to the terminal, the ASP may determine the location of the V-USI system according to the V-USI realm name information in the short-lived USI ID. Because the V-USI system stores part or all of the USI registration information of the terminal, the ASP can invoke the V-USI system to provide some visited area services after completion of registration.

Figure 13:
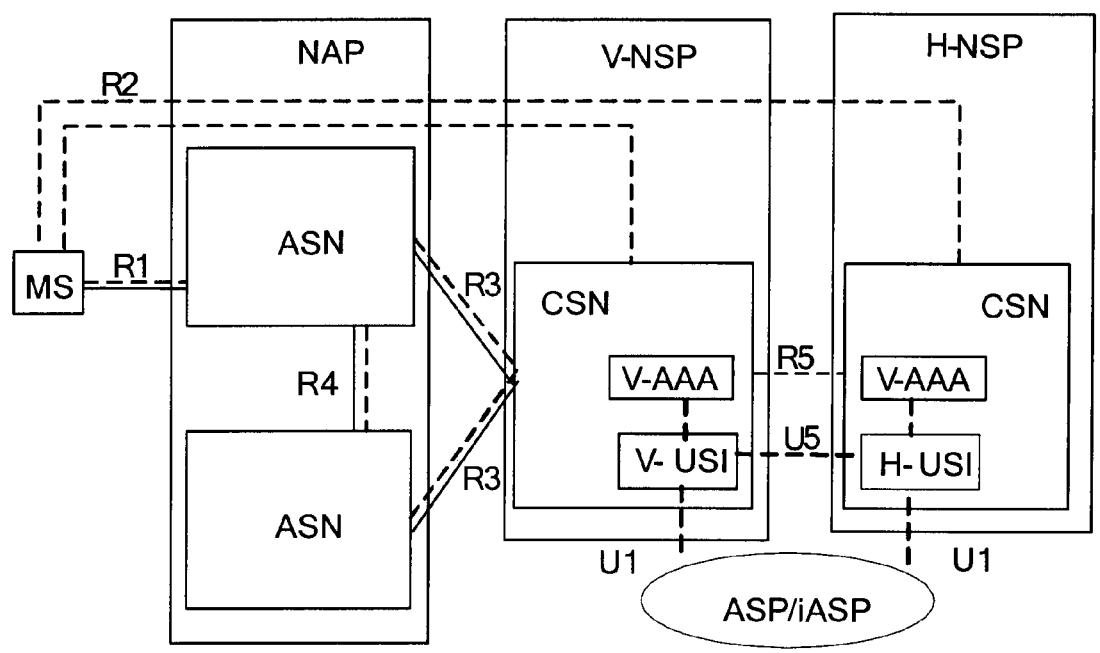
FIG. 13 shows an application scenario of a USI system in an embodiment of the present invention.

In the application scenario of another embodiment, if the ASP has a direct U1 interface to both the H-USI system and the V-USI system, as shown in FIG. 13, the ASP may prefer the H-USI system at the time of initiating USI registration for the terminal, for example, prefer the technical solution shown in FIG. 8 at the time of registration. If no direct interface exists between the ASP and the H-USI, the ASP may prefer the V-USI system, for example, prefer the technical solution shown in FIG. 7 at the time of registration. If neither the H-USI system nor the V-USI system is interfaced with the ASP through a U1 interface, a third-party network USI system routed to the H-USI system may be selected.

In the scenario shown in FIG. 13 above, in service invocation, the ASP may invoke different U1 interfaces according to different service types, for example, invoke the V-USI system through the U1 interface connected with the V-USI system as regards the local services such as MCBCS and QoS request. For the services provided by the home network, for example, querying terminal capabilities and querying terminal state, the H-USI system can be invoked through the interface connected with the H-USI system.

In the foregoing embodiment, the registration of a roaming terminal in the USI system is triggered by the ASP. In practice, the registration of a roaming terminal in the USI system may also be triggered by an H-AAA server or V-AAA server. This solution is applicable to the scenarios shown in FIG. 3, FIG. 4, FIG. 5, and FIG. 6.

Figure 9:
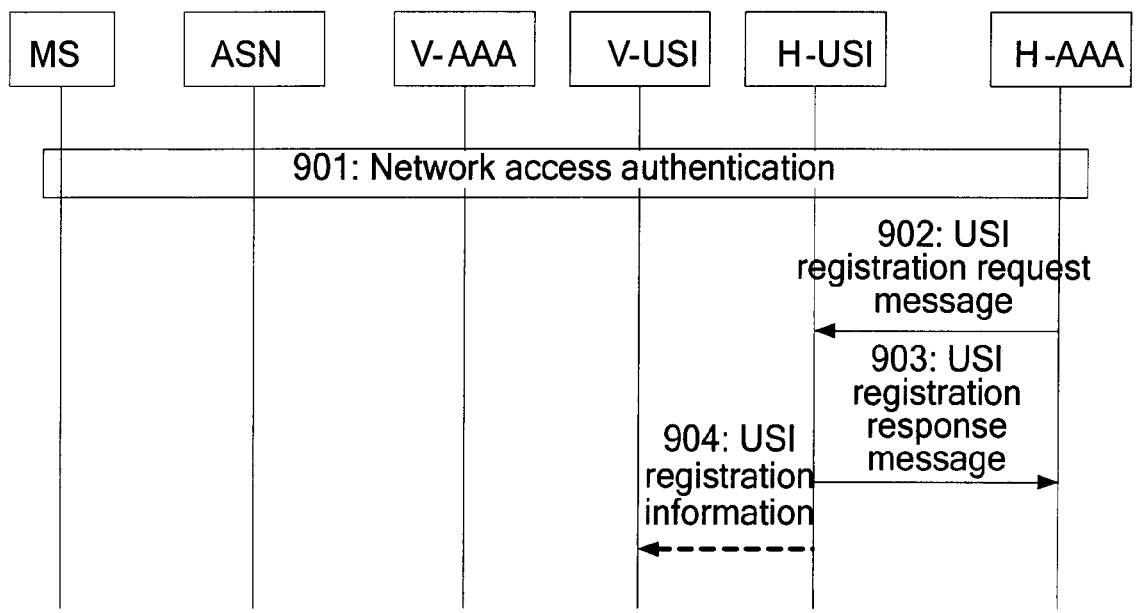
FIG. 9 is a flowchart of a USI system registration method in an embodiment of the present invention.

Another embodiment of the present invention discloses a method of USI system registration triggered by the H-AAA server. As shown in FIG. 9, the method includes the following steps:

901: The terminal is authenticated for accessing the network.

For example, the terminal accesses the network successfully after roaming to a remote area, and the H-AAA server obtains the terminal information such as capability information and subscription information, including the USI subscription information of the terminal.

902: The H-AAA server sends a USI registration request message to the H-USI system.

The request includes a terminal identifier. The identifier is the permanent USI ID of the terminal, and may be the IP address of the terminal, NAI, USI subscription information of the terminal, or device and network capability information.

903: After receiving the registration request message from the H-AAA server, the H-USI system interacts with the H-AAA server, performs USI registration for the terminal, and sends a registration response message to the H-AAA server.

According to the registration request message from the H-AAA server, the H-USI system interacts with the H-AAA server, performs USI registration for the terminal, and stores the terminal information. After registering the terminal successfully, the H-USI system may allocate a short-lived USI ID to the terminal as a USI identity of the terminal at the time of invoking the USI service. The H-USI sends a registration response message to the H-AAA server. The registration response message may carry the short-lived USI ID allocated to the terminal.

904: Upon completion of the USI registration, the H-USI system may send part or all of the USI registration information of the terminal to the V-USI system.

If the H-USI system allocates a short-lived ID to the terminal in step 903, this message further carries the short-lived ID allocated by the H-USI.

If the V-USI system stores part or all of the USI registration information of the terminal, after completion of registration, the ASP may invoke the V-USI system to provide some visited area services such as broadcast service, QoS query, and terminal positioning. Part or all of the registration information of the USI system is sent to the V-USI system through the U5 interface. The short-lived USI ID allocated by the H-USI system to the terminal reflects the location of the V-USI system of the terminal. For example, V-USI realm name information can be added into the USI ID. Upon completion of registration, the ASP can determine the location of the V-USI system according to the V-USI realm name information in the short-lived USI ID.

In the foregoing embodiment, if the visited network has no USI system, no U5 interface exists between the H-USI system and the V-USI system. In this case, the foregoing solution is also applicable, with step 904 being omitted.

In the foregoing embodiment, the H-AAA server triggers the USI registration for the terminal, and allocates a short-lived USI ID to the terminal. The V-USI realm name information is added into the short-lived USI ID, and the ASP can determine the location of the V-USI system according to the V-USI realm name information in the short-lived USI ID. Because the V-USI system stores part or all of the USI registration information of the terminal, the ASP can invoke the V-USI system to provide some visited area services after completion of registration.

Figure 10:
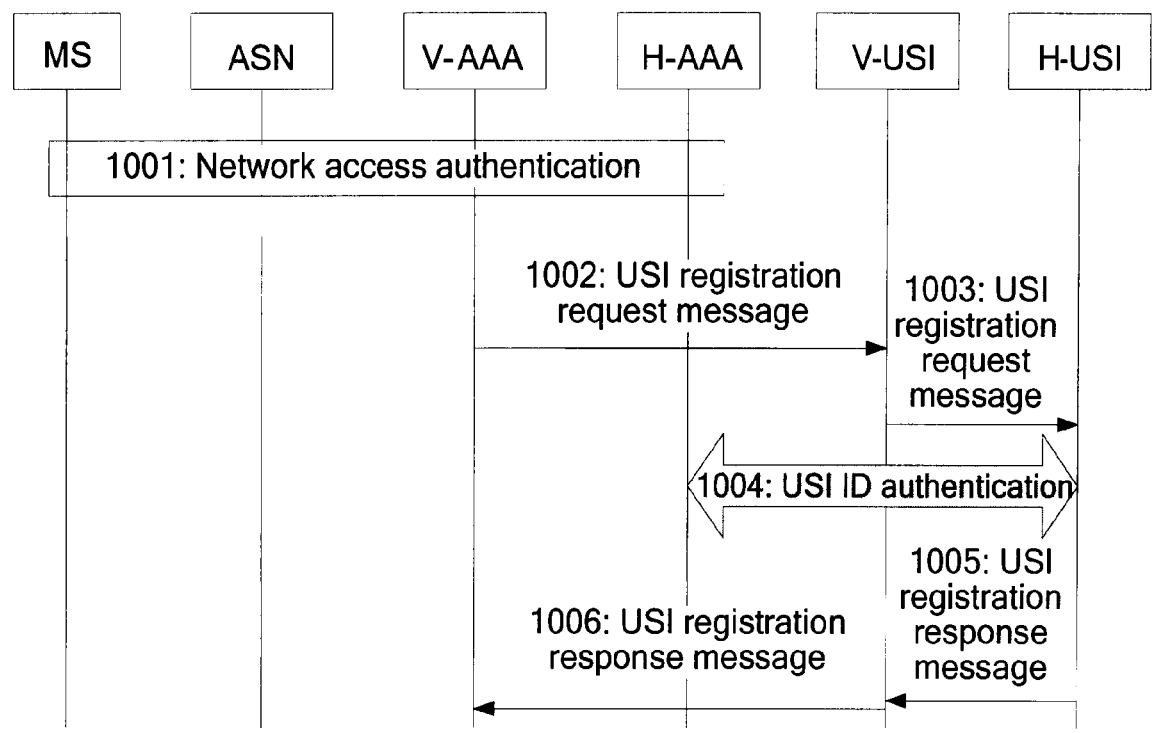
FIG. 10 is a flowchart of a USI system registration method in an embodiment of the present invention.

Another embodiment of the present invention discloses a method of USI system registration triggered by the V-AAA server. As shown in FIG. 10, the method includes the following steps:

1001: The terminal is authenticated for accessing the network.

For example, the terminal accesses the network successfully after roaming to a remote area, and the H-AAA server obtains the terminal capability information and subscription information, including the USI subscription information of the terminal. In this process, the H-AAA server may send the permanent USI ID of the terminal to the V-AAA server.

1002: The V-AAA server triggers the USI registration, and sends a USI registration request message to the V-USI system. The request carries a terminal identifier. The terminal identifier may be the permanent USI ID of the terminal, and may be the IP address of the terminal, NAI, USI subscription information of the terminal, or device and network capability information.

1003: The V-USI system forwards the USI registration request message to the H-USI system.

This registration request message is forwarded through the U5 interface.

1004: The H-USI system interacts with the H-AAA server to perform USI system registration for the terminal.

This step is similar to step 703. The H-USI system stores the terminal information after completion of USI registration for the terminal. The H-USI may allocate a short-lived USI ID to the terminal for identifying the USI system of the terminal at the time of invoking the service of the USI system.

The short-lived USI ID allocated by the H-USI system to the terminal reflects the location of the V-USI system of the terminal. For example, V-USI realm name information can be added into the USI ID. Upon completion of registration, the ASP can determine the location of the V-USI system according to the V-USI realm name information in the short-lived USI ID.

1005: The H-USI system sends a USI registration response message to the V-USI system.

The registration response message carries part or all of the USI registration information of the terminal. If the H-USI system allocates a short-lived USI ID to the terminal in step 1004, this registration response message may carry the short-lived USI ID.

1006: The V-USI system forwards the USI registration response message to the V-AAA server.

The registration response message carries part or all of the USI registration information of the user. If the H-USI system allocates a short-lived USI ID to the terminal in step 1004, the registration response message may carry the short-lived USI ID. The ASP may determine the location of the V-USI system according to the V-USI realm name information in the short-lived USI ID of the terminal.

If the V-USI system stores the USI registration information of the user, the ASP may invoke the V-USI system to provide some visited area services such as broadcast service, QoS query, and terminal positioning.

In the foregoing embodiment, the V-AAA server triggers the USI registration for the terminal, and the USI registration request message is forwarded by the V-USI system to the H-USI system through the newly added U5 interface. In this way, the roaming terminal is registered on the USI system, and the subsequent USI services can be implemented smoothly. Moreover, because the V-USI realm name information is added into the short-lived USI ID allocated to the terminal, after completion of registration, the ASP may determine the location of the V-USI system according to the V-USI realm name information in the USI ID. Therefore, the ASP can invoke the V-USI system to provide some visited area services such as broadcast service, QoS query, and terminal positioning.

Figure 11:
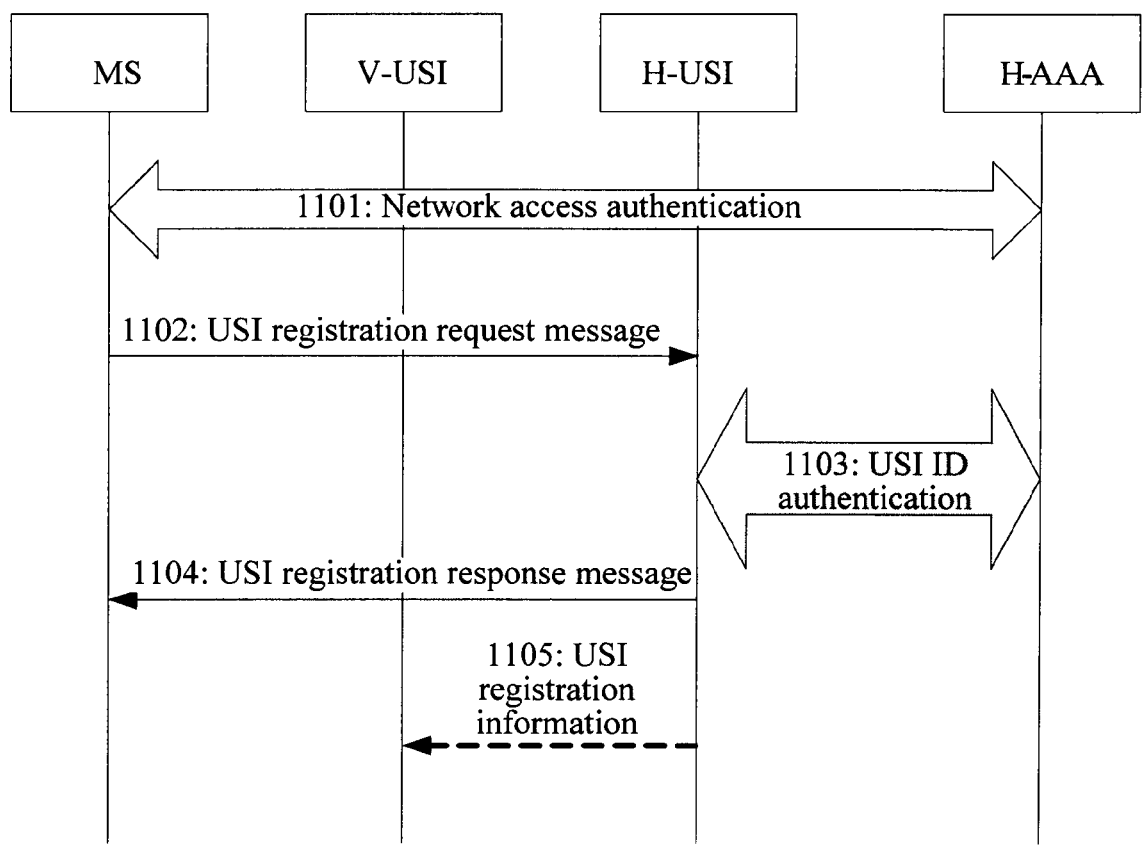
FIG. 11 is a flowchart of a USI system registration method in an embodiment of the present invention.

Another embodiment of the present invention discloses a method of USI system registration triggered by the terminal. As shown in FIG. 11, the method includes the following steps:

1101: The terminal is authenticated for accessing the network.

For example, the terminal accesses the network successfully after roaming to a remote area, and the H-AAA server obtains the terminal information such as capability information and subscription information, including the USI subscription information of the terminal. This process is covered by the prior art, and is not repeated here any further.

1102: The terminal sends a USI registration request message to the H-USI system. The request carries a terminal identifier. The terminal identifier may be the permanent USI ID of the terminal, and may be the IP address of the terminal, or NAI.

1103: The H-USI system interacts with the H-AAA server to perform USI system registration for the terminal.

This step is similar to step 703. The H-USI stores the terminal information after completion of USI registration for the terminal. The H-USI system may allocate a short-lived USI ID to the terminal as a USI identifier of the terminal at the time of invoking the USI service. The short-lived USI ID allocated by the H-USI system to the terminal reflects the location of the V-USI system of the terminal. For example, V-USI realm name information can be added into the USI ID. Upon completion of registration, the ASP can determine the location of the V-USI system according to the V-USI realm name information in the short-lived USI ID.

1104: The H-USI system sends a USI registration response message to the terminal.

If the H-USI system allocates a short-lived USI ID to the terminal in step 1104, this registration response message may carry the short-lived USI ID.

1105: Upon completion of the USI registration, the H-USI system may send part or all of the USI registration information of the terminal to the V-USI system.

The registration response message carries part or all USI registration information of the user. For example, if the H-USI system allocates a short-lived USI ID to the terminal in step 1103, this registration response message may carry the short-lived USI ID.

In the foregoing embodiment, if the visited network has no USI system, no U5 interface exists between the H-USI system and the V-USI system. In this case, the foregoing solution is also applicable, with step 1105 being omitted.

If the V-USI system stores the USI registration information of the terminal, the ASP may invoke the V-USI system to provide some visited area services such as broadcast service, QoS query, and terminal positioning.

In the foregoing embodiment, the terminal triggers the USI registration for the terminal directly, and the subsequent USI registration is implemented as required by the terminal. Moreover, because the V-USI realm name information is added into the short-lived USI ID allocated to the terminal, the ASP may determine the location of the V-USI system according to the V-USI realm name information in the short-lived USI ID. Because the V-USI system stores part or all of the USI registration information of the terminal, the ASP can invoke the V-USI system to provide some visited area services after completion of registration.

Figure 12:
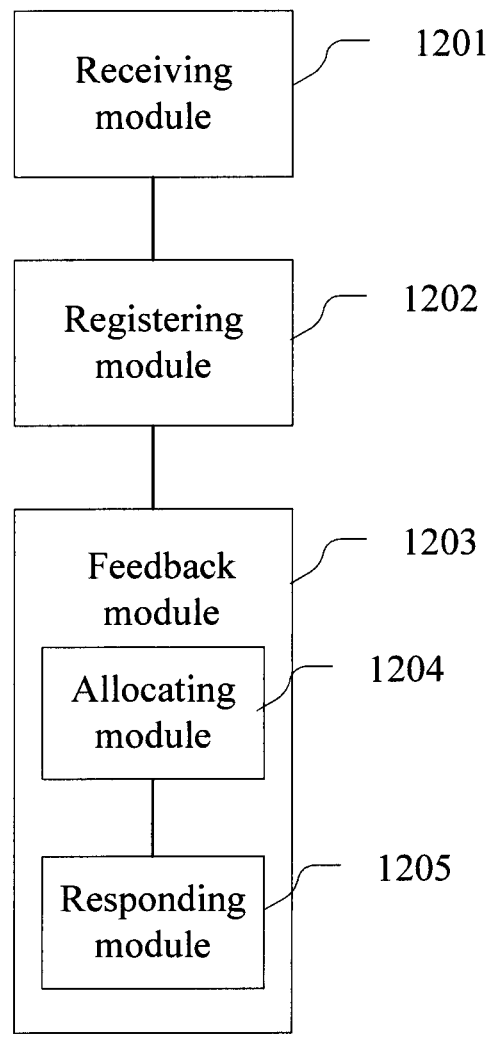
FIG. 12 shows a structure of a USI system registration apparatus in an embodiment of the present invention.

As shown in FIG. 12, a USI system registration apparatus disclosed in an embodiment of the present invention includes:
a receiving module 1201, adapted to receive a USI registration request message that carries an identifier of a terminal; and
a registering module 1202, adapted to perform USI system registration for the terminal according to the USI registration request message.

According to the method in FIG. 7, the USI registration request message comes from the V-USI system; according to the method in FIG. 8, the USI registration request message comes from the ASP; according to the method in FIG. 9, the USI registration request message comes from the H-AAA server; according to the method in FIG. 10, the USI registration request message comes from the H-USI system; according to the method in FIG. 11, the USI registration request message comes from the MS.

The apparatus may further include:
a feedback module 1203, adapted to feed back a USI registration response message.

According to the method in FIG. 7, the USI registration response message is fed back to the V-USI system; according to the method in FIG. 8, the USI registration response message is fed back to the ASP; according to the method in FIG. 9, the USI registration response message is fed back to the H-AAA server; according to the method in FIG. 10, the USI registration response message is fed back to the H-USI system; according to the method in FIG. 11, the USI registration response message is fed back to the terminal.

The feedback module 1203 may further include:
an allocating module 1204, adapted to allocate a short-lived ID to the terminal; and
a responding module 1205, adapted to feed back a USI registration response message that carries the short-lived ID of the terminal.

The USI registration response message carries part or all of the USI registration information of the terminal.

The foregoing apparatus is a USI system, and may be a stand-alone apparatus integrated in the USI system.

A CSN is disclosed in an embodiment of the present invention. The CSN includes the foregoing USI system registration apparatus.

A system for registering in a USI system is disclosed in an embodiment of the present invention. The system includes a V-USI system and an H-USI system.

The V-USI system is adapted to send a USI registration request message that carries an identifier of a terminal to the H-USI system.

The H-USI system interacts with an H-AAA server according to the USI registration request message to perform USI system registration for the terminal.

A radio communication system is disclosed in an embodiment of the present invention. As shown in FIG. 3-FIG. 6, the radio communication system includes a V-CSN, an H-CSN, and an HA. The interface between the V-CSN and the H-CSN is R5. The V-CSN includes a V-USI system, and the H-CSN includes an H-USI system. A U5 interface exists between the H-USI system and the V-USI system. The U5 interface is a stand-alone interface or a part of the logical interface of the R5 interface.

The U5 interface is adapted to transmit service-related information between the H-USI system and the V-USI system.

The HA is adapted to transmit the service data between the ASP and the terminal.

The HA is located in the H-CSN or V-CSN.

The communication system further includes an ASP. The ASP can determine the address of the H-USI system or V-USI system according to the IP address of the terminal or the address of the HA.

The service-related information between USI systems may be a USI registration request message between USI systems, USI service invocation message between USI systems, USI ID authentication message between USI systems, USI service charging message between USI systems, or USI service supportability negotiation message between USI systems.

The foregoing radio communication system may be a WiMAX system, or another radio communication system similar to WiMAX.

When the U5 transmits the registration request message between USI systems, the V-USI is adapted to send a USI registration request message that carries a terminal identifier; and the H-USI system is adapted to perform USI system registration for the terminal according to the USI registration request message.

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

The invention claimed is:

1. A method for registering a Universal Service Interface (USI) system within a network, wherein the registered USI system facilitates content services provided to a terminal, the method comprising:
receiving by a Home network USI (H-USI) system within a home network, a USI registration request message directly sent from a Visited network USI (V-USI) system within a Visited network, wherein the USI registration request message carries an identifier of a terminal;
interacting with a Home network Authentication Authorization Accounting (H-AAA) server to perform authentication on the received USI registration request message and to perform USI system registration for the terminal;
allocating, by the H-USI system, a short-lived USI identifier (ID) to the terminal, and the H-USI system sending a USI registration response message, which carries the short-lived USI ID, directly to the V-USI system;
wherein the allocated short-lived USI ID carries realm name information of the V-USI system in order that the terminal starts receiving services provided via the V-USI system.

2. The method of claim 1, wherein:
the USI registration request message is sent by an Application Service Provider (ASP) to the V-USI system; or
the USI registration request message is sent by a Visited network Authentication Authorization Accounting (V-AAA) server to the V-USI system after access authentication.

3. The method of claim 2, wherein: if the USI registration request message is sent by the ASP to the V-USI system, before the ASP sends the USI registration request message to the V-USI system, the method further comprises:
determining, by the ASP, location of the V-USI system according to an Internet Protocol (IP) address of the terminal or USI route information configured by the ASP.

4. The method of claim 1, wherein:
the USI registration response message carries part or all of USI registration information.

5. A method for registering a Universal Service Interface (USI) system, wherein the registered USI system facilitates content services provided to a terminal, the method comprising:
receiving by a Home network USI (H-USI) system within a home network, a USI registration request message directly sent from anyone of: a terminal, an Application Service Provider (ASP), or a Home network Authentication Authorization Accounting (H-AAA) server, wherein the USI registration request message carries an identifier of the terminal;
interacting with the H-AAA server to perform authentication on the received USI registration request message and to perform USI system registration for the terminal; and
allocating, by the H-USI system, a short-lived USI identifier (ID) to the terminal, and the H-USI system sending a USI registration response message that carries the short-lived USI ID directly to the terminal, the ASP, or the H-AAA server;
wherein the allocated short-lived USI ID carries realm name information of the V-USI system in order that the terminal starts receiving services provided via the V-USI system.

6. The method of claim 5, wherein:
the USI registration response message sent by the H-USI system to the ASP further carries part or all of USI registration information of the terminal.

7. The method of claim 5, further comprising:
sending, by the H-USI system, part or all of USI registration information of the terminal to a Visited network USI (V-USI) system, wherein the USI registration information carries the short-lived USI ID.

* * * * *